United States Patent
Ando et al.

(10) Patent No.: US 9,588,364 B2
(45) Date of Patent: Mar. 7, 2017

(54) DISPLAY DEVICE

(71) Applicant: Funai Electric Co., Ltd., Daito, Osaka (JP)

(72) Inventors: Satoshi Ando, Osaka (JP); Tatsuji Sudo, Osaka (JP); Yasuhiro Mori, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 203 days.

(21) Appl. No.: 14/255,803

(22) Filed: Apr. 17, 2014

(65) Prior Publication Data

US 2014/0347594 A1 Nov. 27, 2014

(30) Foreign Application Priority Data

May 23, 2013 (JP) ................................. 2013-109178

(51) Int. Cl.
  *G02F 1/1333* (2006.01)
  *H05K 5/02* (2006.01)
  *H05K 5/00* (2006.01)

(52) U.S. Cl.
  CPC ......... *G02F 1/133308* (2013.01); *H05K 5/02* (2013.01); *G02F 2001/133314* (2013.01);
  (Continued)

(58) Field of Classification Search
  CPC ......... G02F 1/133308; G02F 1/133314; G02F 1/133317; G02F 1/133328; G02F 1/133322;
  (Continued)

(56) References Cited

U.S. PATENT DOCUMENTS

| 7,864,263 B2 * | 1/2011 | Kim .................. G02F 1/133308 349/58 |
| 7,940,287 B2 * | 5/2011 | Kim .................. G02F 1/133308 345/102 |

(Continued)

FOREIGN PATENT DOCUMENTS

JP  2007-233251 A  9/2007

OTHER PUBLICATIONS

Extended European Search Report of the corresponding European Application No. 14 166 660.2, dated Jan. 5, 2016.

*Primary Examiner* — Paisley L Arendt
*Assistant Examiner* — Angela Davison
(74) *Attorney, Agent, or Firm* — Global IP Counselors, LLP

(57) ABSTRACT

A display device includes a display panel, a rear face housing, and a slender support member. The display panel is configured to display image. The rear face housing is disposed on a rear side of the display device with respect to the display panel. The support member is disposed between a peripheral edge portion of the display panel and a peripheral edge portion of the rear face housing. The support member supports the peripheral edge portion of the display panel from the rear side. The support member has a protruding portion that protrudes in a direction intersecting a lengthwise direction of the support member. The rear face housing includes an insertion component at the peripheral edge portion of the rear face housing, with the protruding portion of the support member being engaged with the insertion component of the rear frame housing.

12 Claims, 15 Drawing Sheets

(52) U.S. Cl.
CPC ........... *G02F 2001/133317* (2013.01); *G02F 2001/133322* (2013.01); *G02F 2001/133325* (2013.01); *G02F 2201/46* (2013.01)

(58) Field of Classification Search
CPC ........... G02F 1/133325; G02F 2201/46; G02F 2001/133317; G02F 2001/133328; G02F 2001/133314; G02F 2001/133322; G02F 2001/133325; G06F 1/1626; G06F 1/1637; H05K 5/02; H05K 5/0017; H05K 5/0217; H05K 7/14; H05K 7/1401; H05K 7/1438; Y10S 345/905
USPC .......... 349/58; 348/787, 794, 836, 843, 789; 345/905; 362/97.1, 97.2, 632, 633; 361/679.02, 679.26, 679.3, 679.55, 361/679.56, 724, 829; 248/917; 312/7.2, 312/223.1, 223.2
See application file for complete search history.

(56) References Cited

U.S. PATENT DOCUMENTS

| | | | |
|---|---|---|---|
| 8,008,570 B2* | 8/2011 | Han | ................... G02F 1/133308 349/58 |
| 2004/0189889 A1 | 9/2004 | Nitto et al. | |
| 2012/0176009 A1* | 7/2012 | Muroi | ................... G06F 1/1654 312/223.1 |

* cited by examiner

DISPLAY DEVICE

CROSS-REFERENCE TO RELATED APPLICATIONS

This application claims priority to Japanese Patent Application No. 2013-109178 filed on May 23, 2013. The entire disclosure of Japanese Patent Application No. 2013-109178 is hereby incorporated herein by reference.

BACKGROUND

Field of the Invention

This invention generally relates to a display device. More specifically, the present invention relates to a display device for displaying image.

Background Information

Conventionally, display devices, such as liquid crystal television sets, are well-known in the art (see Japanese Unexamined Patent Application Publication No. 2007-233251 (Patent Literature 1), for example). Conventional display devices have a backlight unit for shining light at the rear face of a display panel.

The housing of such display devices has a plastic front cabinet disposed so as to cover the outer peripheral part of the display panel, and a sheet metal rear frame disposed on the rear face side of the display panel. A backlight unit made up of an LED (light emitting diode), for example, is disposed on the rear frame.

A slender, plastic cell guide is disposed between the peripheral edge of the rear frame and the peripheral edge of the display panel. The cell guide is used to support the peripheral edge of the display panel from the rear face side of the display panel. A protruding portion that protrudes in the lengthwise direction of the cell guide is provided to each of the two ends of the cell guide.

A pair of insertion components is provided to the peripheral edge of the rear frame. Each of the insertion components is folded from the peripheral edge of the rear frame toward the inside of the rear frame. The ends of each of the insertion components extend in a direction substantially perpendicular to the peripheral edge of the rear frame. When the cell guide is attached to the peripheral edge of the rear frame, the protruding portions are inserted into the insertion components while the cell guide is bent in its lengthwise direction.

Further, a diffusion plate for diffusing light from the backlight unit is disposed between the display panel and the backlight unit. The peripheral edge of the diffusion plate is inserted between the cell guide and the peripheral edge of the rear frame.

SUMMARY

However, it has been discovered that the following problems are encountered with the conventional display device discussed above. First, as discussed above, the cell guide is bent in its lengthwise direction during attachment of the cell guide to the peripheral edge of the rear frame as mentioned above. It has been discovered that there is the risk that distortion or whitening of the cell guide will occur. This whitening of the cell guide happens when stress is exerted on the plastic cell guide, causing the cell guide to turn white in some parts. Furthermore, it has also been discovered that since the cell guide tends to lift up from the peripheral edge of the rear frame, it is harder to guide the peripheral edge of the diffusion plate when the peripheral edge of the diffusion plate is inserted between the cell guide and the peripheral edge of the rear frame.

Furthermore, it has also been discovered that since the two ends of each of the insertion components extend in a direction substantially perpendicular to the peripheral edge of the rear frame as mentioned above, the surface area of scrap ends up increasing when the unnecessary contour portion of the rear frame is cut off along a trim line in the stamping of the rear frame. Furthermore, it has also been discovered that the scrap cannot be smoothly discharged into the scrap chute of the stamper die, and that there is a risk that the stamper die will be damaged by scrap remaining in the die instead of being discharged into the scrap chute.

One aspect is to provide a display device with which less distortion of a support member occurs when the support member is attached to a peripheral edge of a rear face housing.

Another aspect is to provide a display device with which there are fewer scrap discharge problems in the stamping of the rear face housing.

In view of the state of the known technology, a display device is provided that includes a display panel, a rear face housing, and a slender support member. The display panel is configured to display image. The rear face housing is disposed on a rear side of the display device with respect to the display panel. The support member is disposed between a peripheral edge portion of the display panel and a peripheral edge portion of the rear face housing. The support member supports the peripheral edge portion of the display panel from the rear side. The support member has a protruding portion that protrudes in a direction intersecting a lengthwise direction of the support member. The rear face housing includes an insertion component at the peripheral edge portion of the rear face housing, with the protruding portion of the support member being engaged with the insertion component of the rear frame housing.

Also other objects, features, aspects and advantages of the present disclosure will become apparent to those skilled in the art from the following detailed description, which, taken in conjunction with the annexed drawings, discloses selected embodiments of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Specifically, the numerical values, shapes, materials, constituent elements, layout and connection of the constituent elements, and so forth described in the following embodiments are provided all just for illustration only and not for the purpose of limiting the invention. The invention is merely defined by the appended claims. Of the constituent elements in the following embodiments, those not discussed in an independent claim are not necessarily required, but will be described for understanding of the embodiments.

First Embodiment

Figure 1:
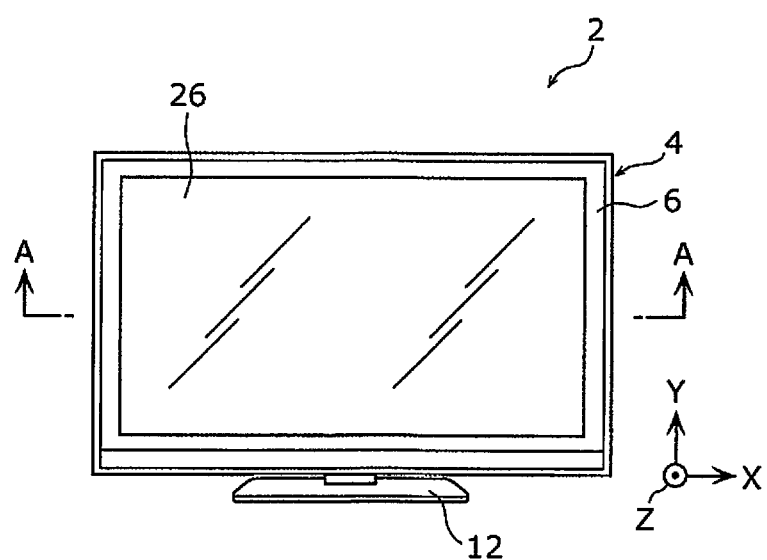
FIG. 1 is a front elevational view of a display device in accordance with a first embodiment.
Figure 2:
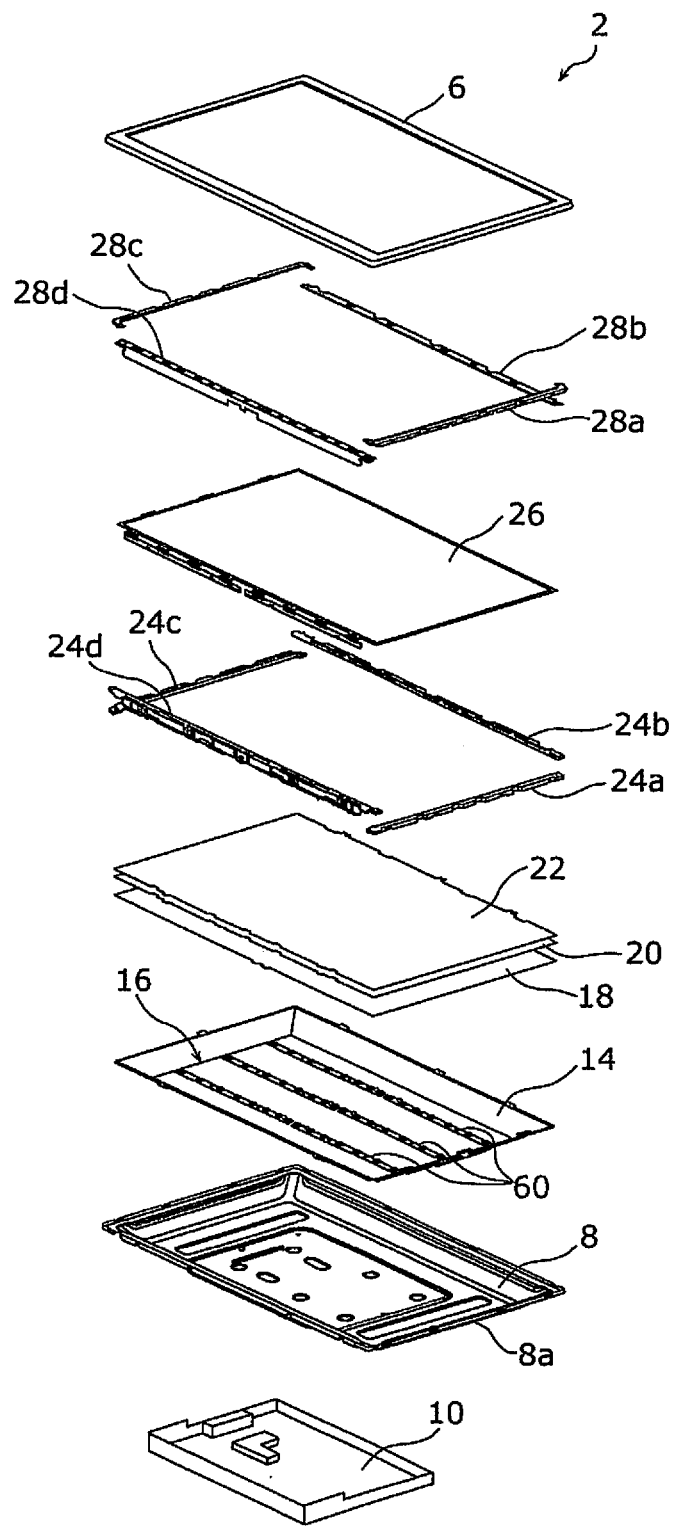
FIG. 2 is an exploded perspective view of the display device in accordance with the first embodiment.
Figure 3:
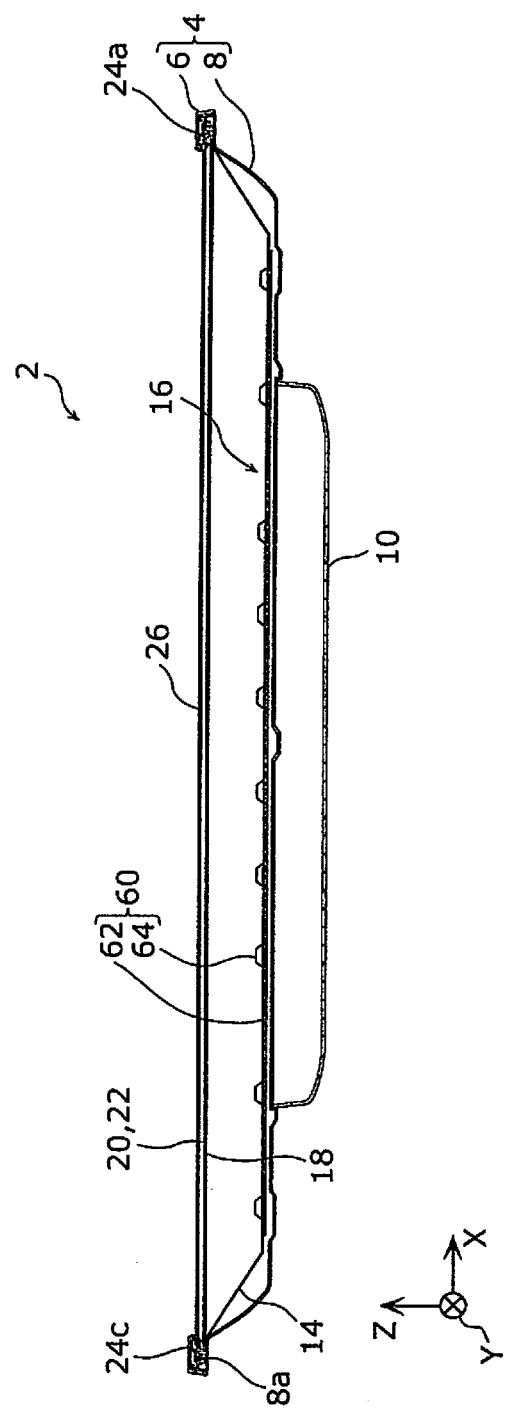
FIG. 3 is a cross sectional view of the display device, taken along A-A line in FIG. 1.

Referring initially to FIGS. 1 to 3, an overall configuration of a display device 2 is illustrated in accordance with a first embodiment. FIG. 1 is a front elevational view of the display device 2. FIG. 2 is an exploded perspective view of the display device 2. FIG. 3 is a cross sectional view of the display device 2, taken along A-A line in FIG. 1.

As shown in FIGS. 1 to 3, the display device 2 is a liquid crystal television set equipped with a housing 4. The housing 4 is made up of a front cabinet 6 and a rear frame 8 (e.g., a rear face housing) that are fitted together.

The front cabinet 6 is configured in the form of a frame, and covers the outer peripheral part of a liquid crystal cell 26 (e.g., a display panel; discussed below). The front cabinet 6 is formed from plastic, for example.

The rear frame 8 is disposed so as to cover the rear face side of the liquid crystal cell 26. A rectangular flange 8a (e.g., a peripheral edge portion of the rear frame 8) that extends toward the outside of the rear frame 8 is provided to an opening in the rear frame 8. The rear frame 8 is made of sheet metal, such as SECC (steel, electrically chromate coated). The structure of the rear frame 8 will be discussed below. Thus, the rear frame 8 is disposed on a rear side of the display device 2 with respect to the liquid crystal panel.

A rear cover 10 is attached in the center part of the outer face of the rear frame 8. A power supply board or the like (not shown) for supplying power to the liquid crystal cell 26, etc., is disposed in the interior of the rear cover 10. A stand 12 for supporting the housing 4 from below is attached to the lower end of the rear cover 10. The rear cover 10 is formed from plastic, for example.

As shown in FIGS. 2 and 3, the display device 2 also includes a reflecting sheet 14, a backlight unit 16, a diffusion plate 18, a pair of optical sheets 20 and 22, four cell guides 24a to 24d (the cell guides 24a and 24c form support members), the liquid crystal cell 26, and four bezels 28a to 28d. The reflecting sheet 14, the backlight unit 16, the diffusion plate 18, the optical sheets 20 and 22, the cell guides 24a to 24d, the liquid crystal cell 26, and the bezels 28a to 28d are disposed in the interior of the housing 4. The internal structure of the display device 2 will be discussed below.

Figure 4:
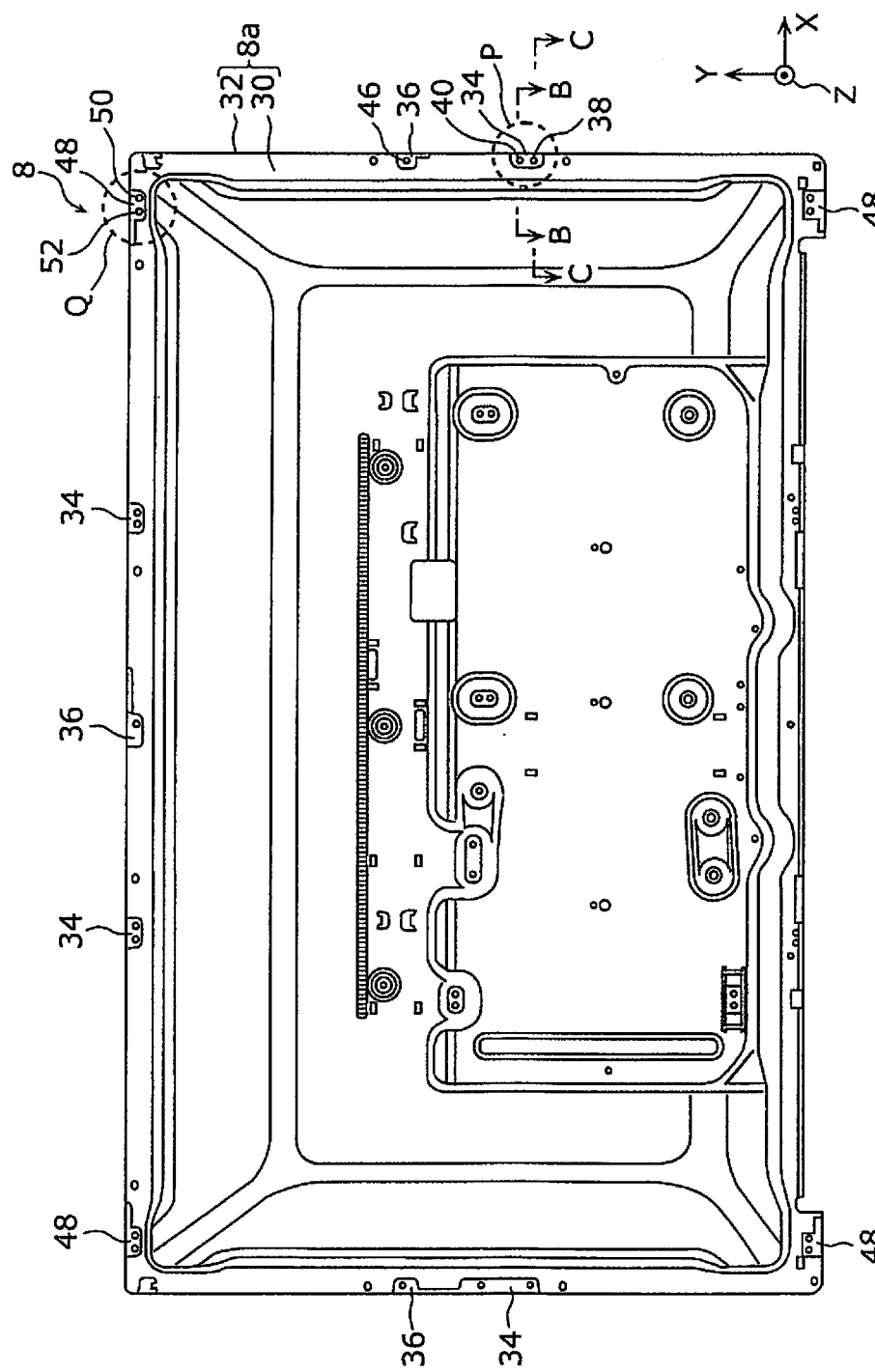
FIG. 4 is a front elevational view of the inner face side of a rear frame of the display device in accordance with the first embodiment.
Figure 5A:
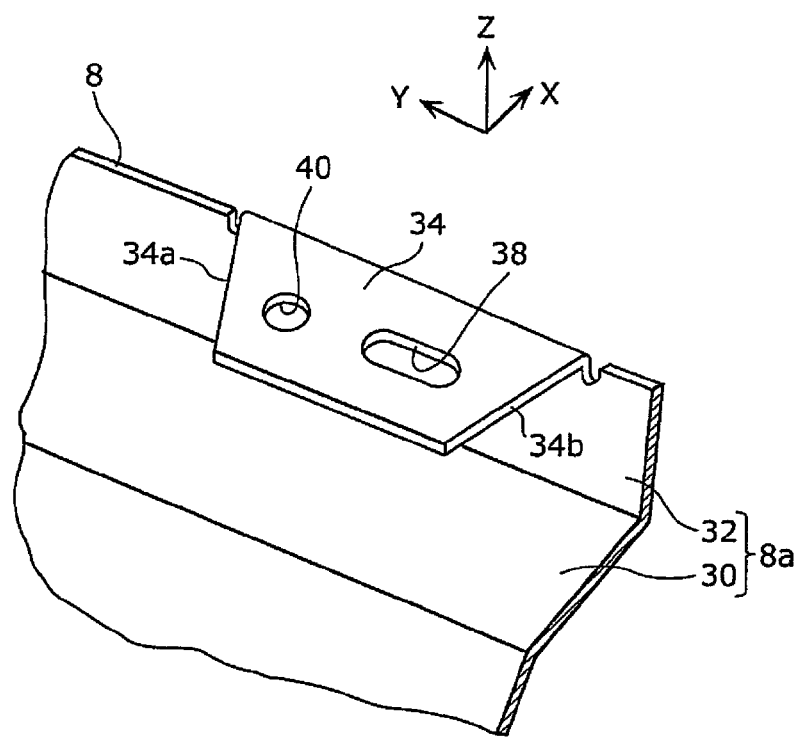
FIG. 5A is a partial perspective view of the rear frame, illustrating a positioning component encircled by a broken line P in FIG. 4.
Figure 5B:
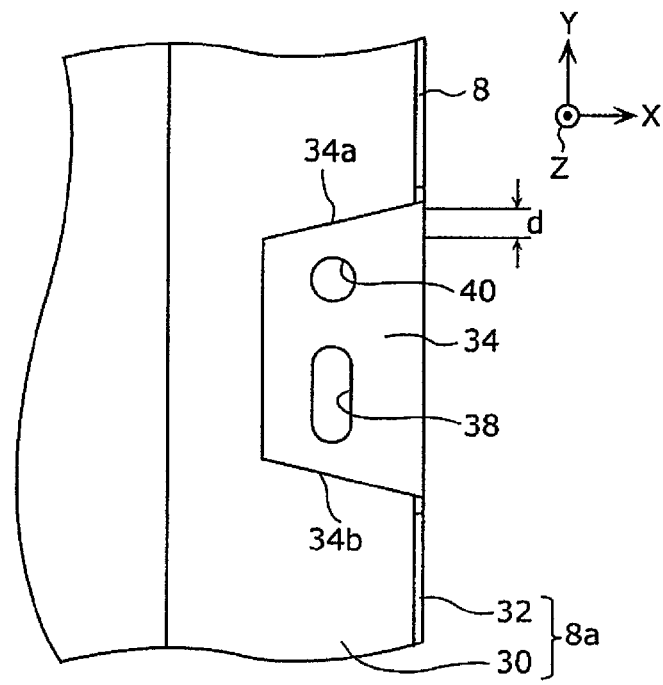
FIG. 5B is a partial plan view of the positioning component encircled by the broken line P in FIG. 4.
Figure 5C:
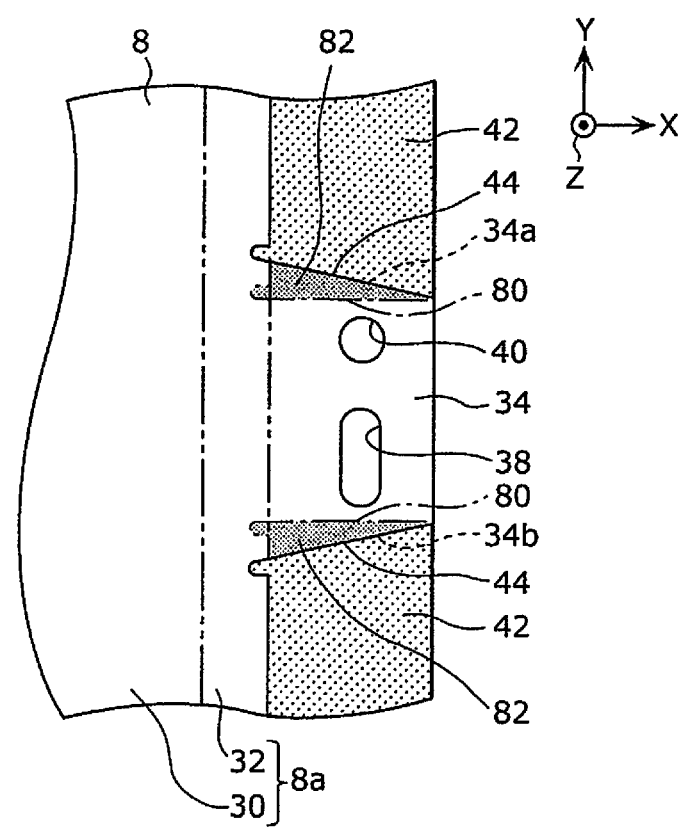
FIG. 5C is a partial plan view of the positioning component, illustrating a state before the positioning component is formed in the stamping of the rear frame.
Figure 6A:
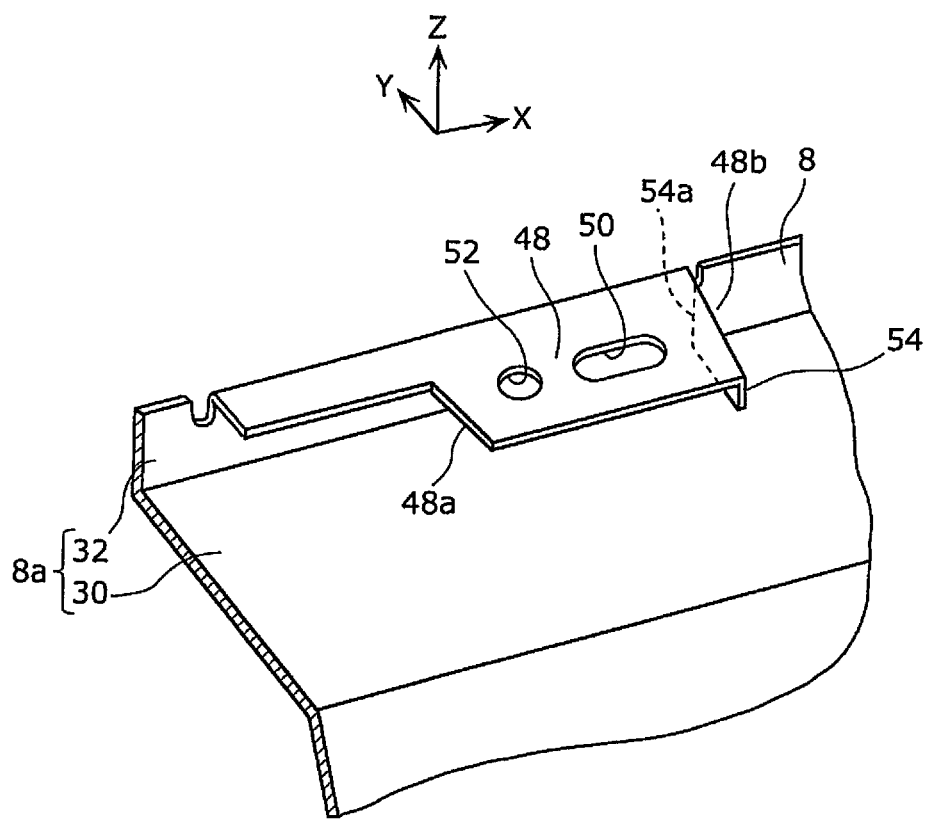
FIG. 6A is a partial perspective view of the rear frame, illustrating an insertion component encircled by a broken line Q in FIG. 4.
Figure 6B:
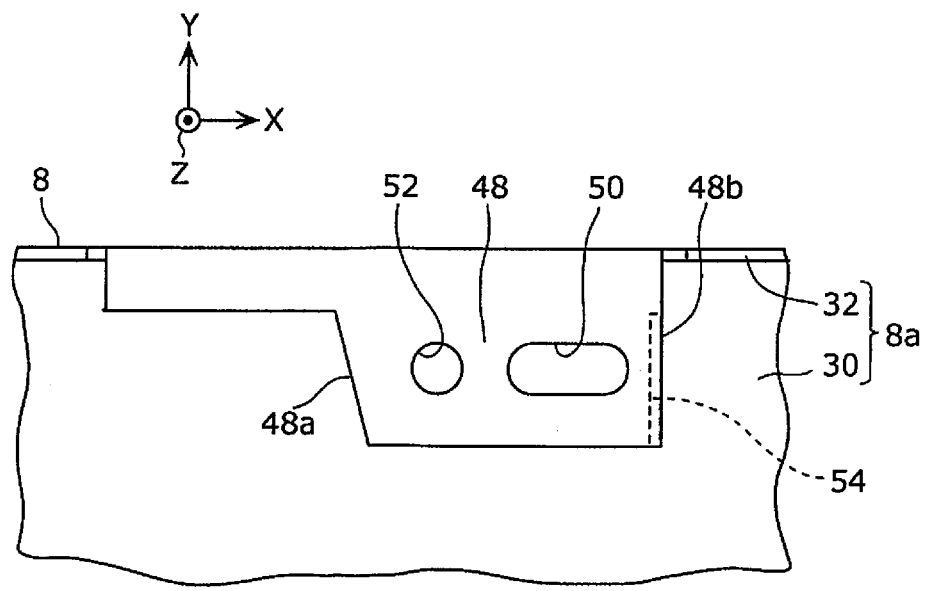
FIG. 6B is a partial plan view of the insertion component encircled by the broken line Q in FIG. 4.
Figure 6C:
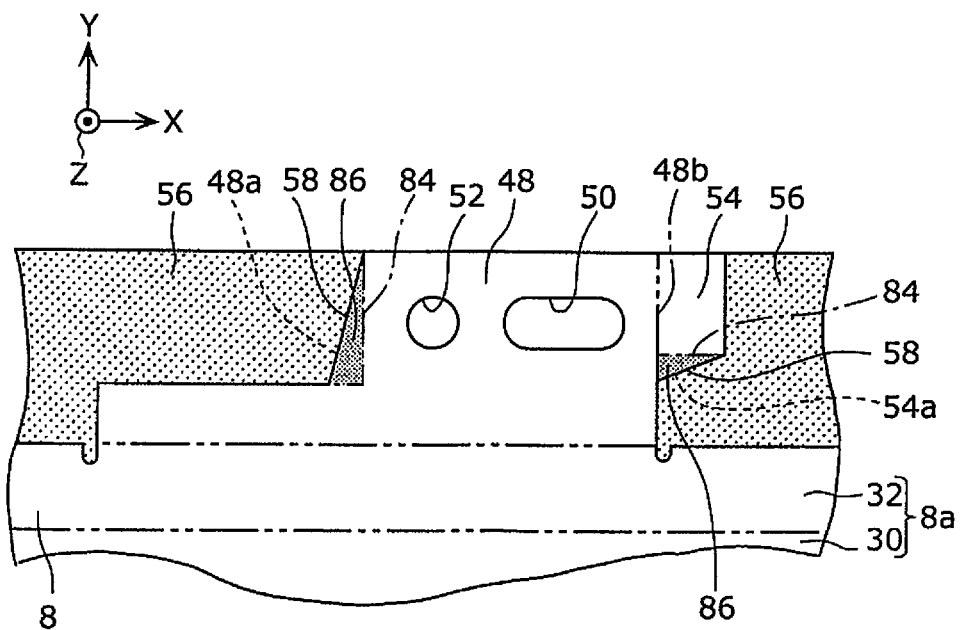
FIG. 6C is a partial plan view of the insertion component, illustrating a state before the insertion component is formed in the stamping of the rear frame.

Next, the structure of the rear frame 8 will now be described through reference to FIGS. 4 to 6C. FIG. 4 is a front elevational view of the inner face side of the rear frame 8 of the display device 2. FIG. 5A is a partial perspective view of the rear frame 8, illustrating a positioning component 34 encircled by a broken line P in FIG. 4. FIG. 5B is a partial plan view of the positioning component 34 encircled by the broken line P in FIG. 4. FIG. 5C is a partial plan view of the positioning component 34, illustrating a state before the positioning component 34 is formed in the stamping of the rear frame 8. FIG. 6A is a perspective view of the rear frame 8, illustrating an insertion component 48 encircled by the broken line Q in FIG. 4. FIG. 6B is a partial plan view of the insertion component 48 encircled by the broken line Q in FIG. 4. FIG. 6C is a partial plan view of the insertion component 48, illustrating a state before the insertion component 48 is formed in the stamping of the rear frame 48.

As shown in FIGS. 4 and 5A, the flange 8a of the rear frame 8 has a frame-shaped support 30 (e.g., a peripheral edge portion) that extends substantially parallel to the liquid crystal cell 26, and a frame-shaped bent component 32 that extends from the peripheral edge of the support 30 to the liquid crystal cell 26 side. Specifically, the bent component 32 extends perpendicularly from the peripheral edge of the support 30 to a front side of the display device 2 to form an outer rim of the rear frame 8 along the peripheral edge of the support 30.

As shown in FIG. 4, the rear frame 8 has a plurality of positioning components 34 and a plurality of positioning components 36 (the positioning components 34 and 36 each forms a mounting component) for positioning the cell guides 24a to 24c (discussed below) with respect to the rear frame 8. The positioning components 34 and 36 are provided to one long side and two short sides of the flange 8a of the rear frame 8. Thus, the rear frame 8 includes the positioning components 34 and 36 arranged to position the cell guides 24a to 24c (e.g., the support members) with respect to the rear frame 8 at the peripheral edge of the support 30 of the rear frame. Also, the rear frame 8 includes the positioning components 34 and 36 (e.g., the mounting components) for mounting the cell guides 24a to 24c (e.g., the support member) relative to the rear frame 8 at the peripheral edge of the support 30 of the rear frame 8.

As shown in FIGS. 5A and 5B, the positioning component 34 is bent from the bent component 32 toward the inside of the rear frame 8. The positioning component 34 is provided with an elliptical concave component 38 and a circular screw hole 40. The concave component 38 extends through the positioning component 34 in the thickness direction thereof. The two ends 34a and 34b (e.g., end edges) of the positioning component 34 extend at an angle to the direction substantially perpendicular to the flange 8a (e.g., the bent component 32) of the rear frame 8 (i.e., the X direction in FIGS. 5A and 5B). Thus, the width of the positioning component 34 (i.e., the width in the Y direction in FIGS. 5A and 5B) gradually decreases toward the distal end of the positioning component 34. As shown in FIG. 5B, the dimension d of the end 34a of the positioning component 34 in the Y direction is about 0.5 to 1.0 mm, for example. Thus, the positioning components 34 (e.g., the positioning component or the mounting component) inwardly extends to face with the support 30 of the rear frame 8. The positioning component 34 has the ends 34a and 34b (e.g., the end edges) that non-parallelly extend with respect to each other such that the width of the positioning component 34 measured between the ends 34a and 34b gradually decreases toward the distal end of the positioning component 34.

The positioning component 34 is formed as follows, for example. First, as shown in FIG. 5C, a step is performed in the stamping of the rear frame 8 in which the unnecessary contour portion 42 of the rear frame 8 (e.g., the portion shaded with dots in FIG. 5C) is cut off along a trim line 44. The contour portion 42 that has been cut off is discharged as scrap into the scrap chute of the stamper die (not shown). After this, a step is performed in which the rear frame 8 is bent along the two-dot chain line in FIG. 5C. This forms the positioning component 34 shown in FIGS. 5A and 5B.

As shown in FIG. 4, the positioning component 36 is similar to the above-mentioned positioning component 34 in that it is bent from the bent component 32 toward the inside of the rear frame 8. An elliptical concave component 46 is provided to the positioning component 36. The concave component 46 extends through the positioning component 36 in the thickness direction thereof. Just as with the positioning component 34, the two ends (e.g., end edges) of the positioning component 36 extend at an angle to the direction substantially perpendicular to the flange 8a (e.g., the bent component 32) of the rear frame 8. Thus, the width of the positioning component 36 steadily decreases toward the distal end of the positioning component 36. Thus, the positioning components 36 (e.g., the positioning component or the mounting component) inwardly extends to face with the support 30 of the rear frame 8. The positioning component 36 has the ends (e.g., the end edges) that non-parallelly extend with respect to each other such that the width of the positioning component 36 measured between the ends gradually decreases toward the distal end of the positioning component 36.

As shown in FIG. 4, the rear frame 8 has a plurality of insertion components 48 (e.g., the mounting components). The insertion component 48 are provided to the four corners of the flange 8a of the rear frame 8, respectively. The insertion components 48 have the function of attaching the cell guides 24a and 24c to the flange 8a of the rear frame 8, and the function of positioning the cell guides 24b and 24d with respect to the rear frame 8.

As shown in FIGS. 6A and 6B, the insertion components 48 are bent from the bent component 32 toward the inside of the rear frame 8. An elliptical concave component 50 and a circular screw hole 52 are provided to each of the insertion components 48. The concave component 50 extends through the insertion component 48 in the thickness direction thereof. One end 48a (e.g., an end edge) of the insertion component 48 extends at an angle to the direction substantially perpendicular to the flange 8a (e.g., the bent component 32) of the rear frame 8 (i.e., the Y direction in FIGS. 6A and 6B). In the illustrated embodiment, the other end 48b (e.g., an end edge) extends in the direction substantially perpendicular to the flange 8a of the rear frame 8. Thus, the width of the insertion component 48 (i.e., the width in the X direction in FIGS. 6A and 6B) gradually decreases toward the distal end of the insertion component 48. Thus, the rear frame 8 includes the insertion component 48 (e.g., the insertion component or the mounting component) at the peripheral edge of the support 30 of the rear frame 8. The insertion component 48 inwardly extends to face with the support 30 of the rear frame 8. The insertion component 48 has the ends 48a and 48b (e.g., the end edges) that non-parallelly extend with respect to each other such that the width of the insertion component 48 measured between the ends 48a and 48b gradually decreases toward the distal end of the insertion component 48.

The insertion component 48 includes a prong 54 that extends toward the support 30 (e.g., the peripheral edge portion) of the flange 8a at the other end 48b of the insertion component 48. One end 54a of the prong 54 extends at an angle to the direction substantially parallel to the flange 8a (e.g., the bent component 32) of the rear frame 8 (i.e., the X direction in FIGS. 6A and 6B). Thus, the width of the prong 54 (i.e., the width in the Y direction in FIGS. 6A and 6B) gradually decreases toward the distal end of the prong 54. Thus, The insertion components 48 are formed as follows, for example. First, as shown in FIG. 6C, a step is performed in the stamping of the rear frame 8 in which the unnecessary contour portion 56 of the rear frame 8 (e.g., the portion shaded with dots in FIG. 6C) is cut off along a trim line 58. The contour portion 56 that has been cut off is discharged as scrap into the scrap chute of the stamper die. After this, a step is performed in which the rear frame 8 is bent along the two-dot chain line in FIG. 6C. This forms the insertion component 48 shown in FIGS. 6A and 6B.

Figure 7:
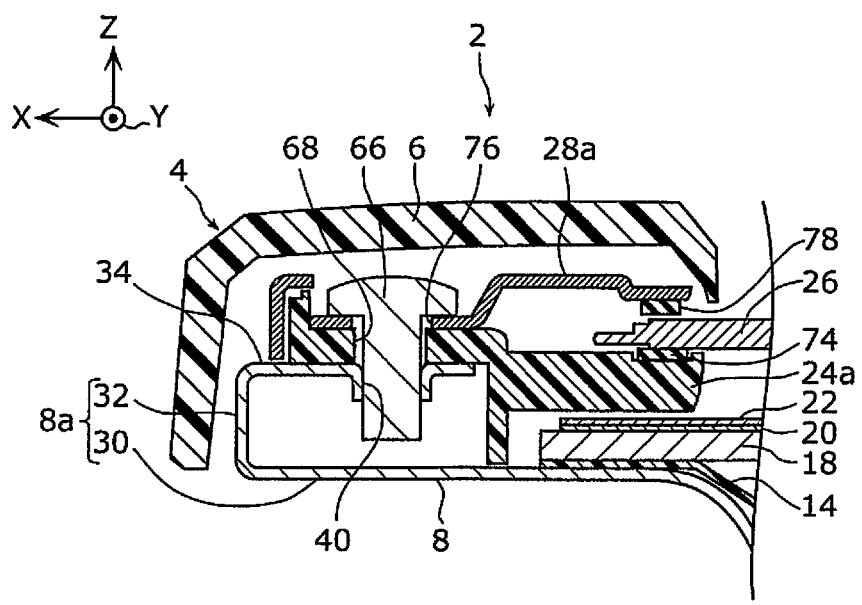
FIG. 7 is a cross sectional view of the display device, taken along B-B line in FIG. 4.
Figure 8:
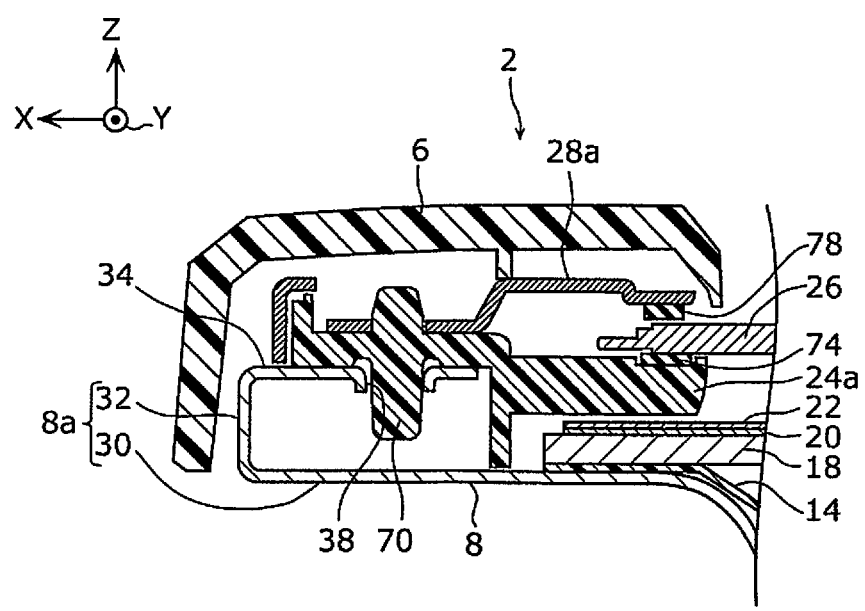
FIG. 8 is a cross sectional view of the display device, taken along C-C line in FIG. 4.
Figure 9:
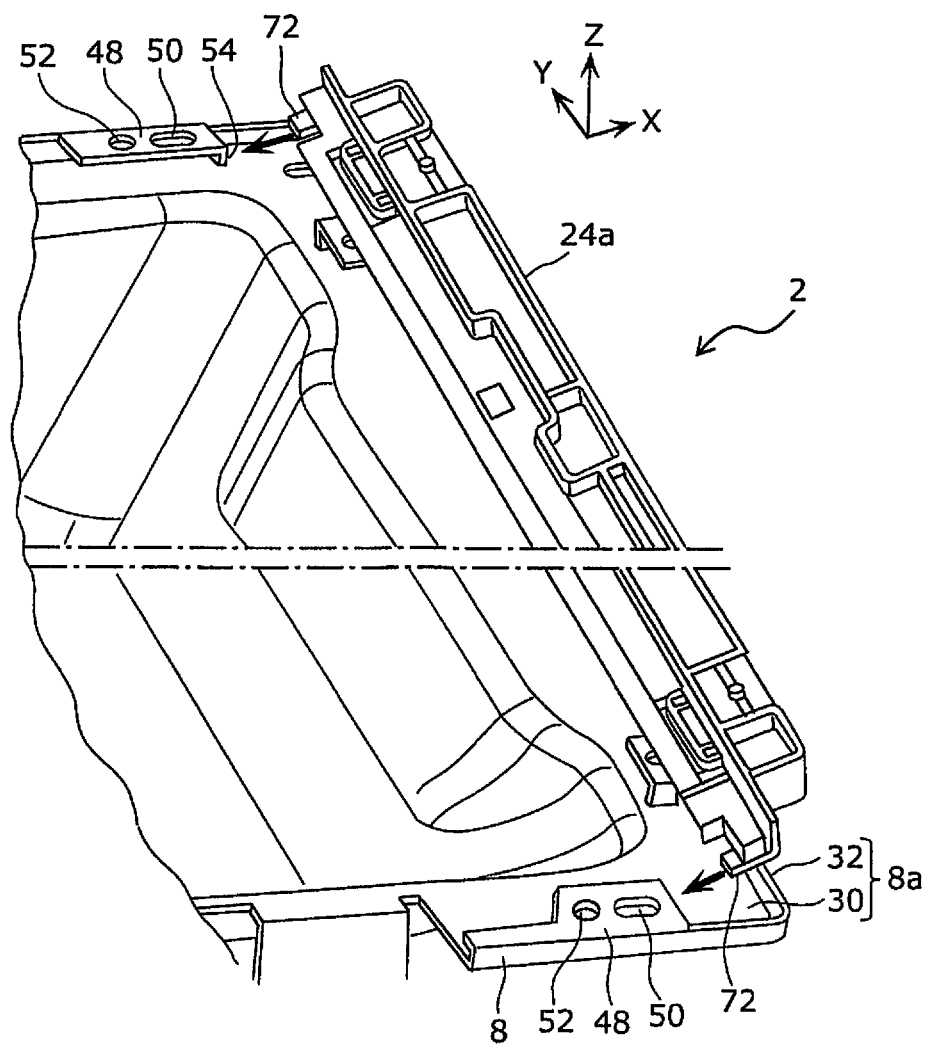
FIG. 9 is a partial perspective view of the display device, illustrating a state before a cell guide is attached to a flange of the rear frame.
Figure 10:
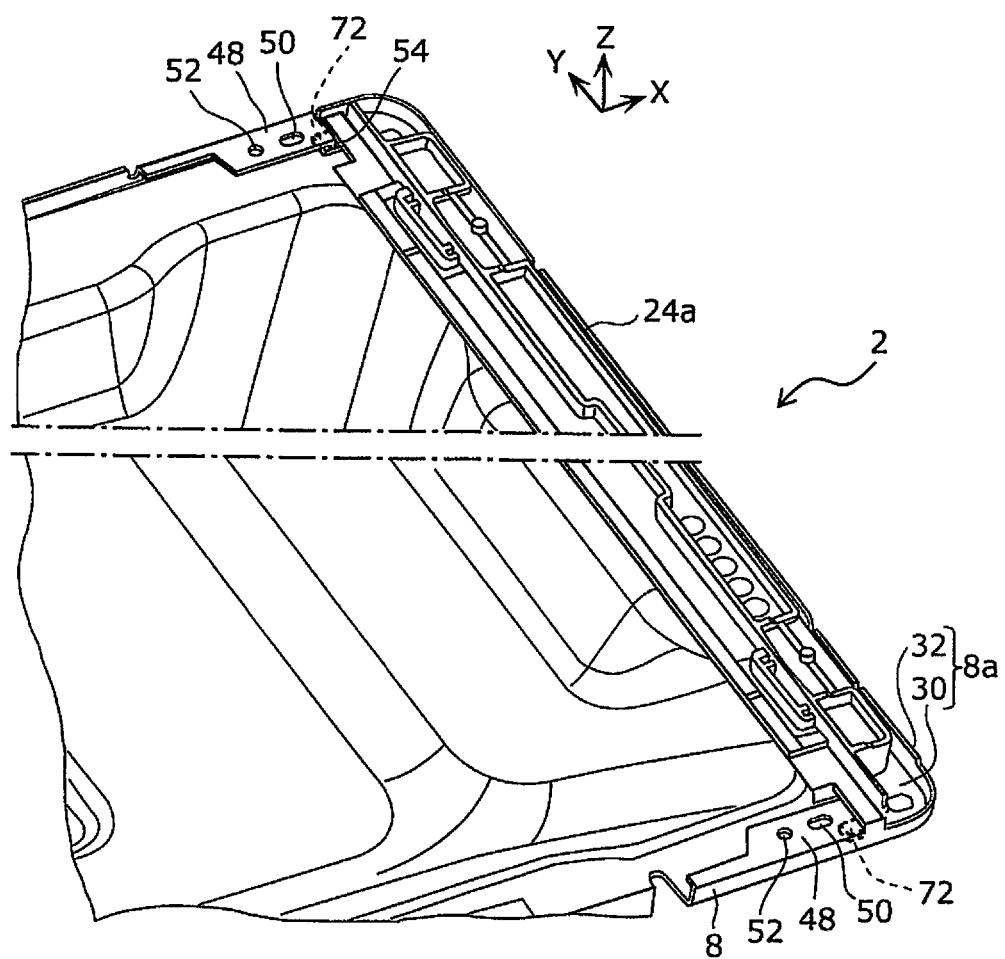
FIG. 10 is a partial perspective view of the display device, illustrating a state when the cell guide is attached to the flange of the rear frame.

Next, the internal structure of the display device 2 will be described through reference to FIGS. 7 to 10. FIG. 7 is a cross sectional view of the display device 2, taken along B-B line in FIG. 4. FIG. 8 is a cross sectional view of the display device 2, taken along C-C line in FIG. 4. FIG. 9 is a partial perspective view of the display device 2, illustrating a state before the cell guide 24a is attached to the flange 8a of the rear frame 8. FIG. 10 is a partial perspective view of the display device 2, illustrating a state when the cell guide 24a is attached to the flange 8a of the rear frame 8.

As shown in FIGS. 3, 7, and 8, the peripheral edges of the reflecting sheet 14, the diffusion plate 18, and the pair of optical sheets 20 and 22 are supported by the support 30 of the flange 8a of the rear frame 8.

The reflecting sheet 14 is disposed so as to cover the inner face of the rear frame 8. The reflecting sheet 14 has the function of reflecting light from the backlight unit 16.

The backlight unit 16 is a directly-under type of backlight unit, and is used to shine light toward the rear face of the liquid crystal cell 26. As shown in FIGS. 2 and 3, the backlight unit 16 has a plurality of LED bars 60. Each of the LED bars 60 has a wiring board 62 and a plurality of LEDs 64 mounted on the wiring board 62. The wiring board 62 is in the form of a long, slender, flat piece. The LEDs 64 are disposed spaced apart and in a row in the lengthwise direction of the wiring board 62. The wiring board 62 is attached to the inner face of the rear frame 8 by double-side tape (not shown) having thermal conductivity. The wiring board 62 is formed from a metal with high thermal conductivity, such as aluminum.

As shown in FIGS. 3 and 4, the diffusion plate 18 is disposed between the backlight unit 16 and the liquid crystal cell 26. The diffusion plate 18 has the function of diffusing light from the backlight unit 16. The optical sheets 20 and 22 are each disposed so as to cover the face of the diffusion plate 18 on the liquid crystal cell 26 side in a state in which they have been superposed with one another. Each of the optical sheets 20 and 22 has the function of guiding the light diffused by the diffusion plate 18 to the rear face of the liquid crystal cell 26, for example.

As shown in FIG. 2, the cell guides 24a to 24d (e.g., the slender support members) for supporting the outer peripheral part (e.g., the peripheral edge portion) of the liquid crystal cell 26 from its rear face side are disposed on the corresponding sides of the flange 8a of the rear frame 8. Each of the cell guides 24a to 24d is long and slender. The cell guides 24a to 24d are fitted together to create an overall frame shape. The cell guides 24a and 24c both have the same configuration, and are disposed on the short sides of the flange 8a. The cell guides 24b and 24d both have the same configuration, and are disposed on the long sides of the flange 8a. Each of the cell guides 24a to 24d is formed from plastic, for example. The peripheral edges of the optical sheets 20 and 22 and the diffusion plate 18 are inserted between the flange 8a and the cell guides 24a to 24d. Thus, the cell guides 24a to 24d are disposed between the outer peripheral part (e.g., the peripheral edge portion) of the liquid crystal cell 26 and the support 30 (e.g., the peripheral edge portion) of the rear frame 8. The cell guides 24a to 24d support the outer peripheral part of the liquid crystal cell 26 from the rear side of the display device 2.

The configuration of the cell guide 24a (out of the cell guides 24a to 24d) will now be described. As shown in FIG. 7, a through-hole 68 into which a screw 66 (discussed below) is inserted is provided to the cell guide 24a. As shown in FIG. 8, a pair of protrusions 70 that protrude toward the flange 8a is provided to the rear face of the cell guide 24a (i.e., the face opposite the flange 8a). As shown in FIG. 8, one of the protrusions 70 is inserted into the concave component 38 of the positioning component 34, while the other protrusion 70 is inserted into the concave component 46 of the positioning component 36. This positions the cell guide 24a with respect to the rear frame 8. As shown in FIGS. 9 and 10, a pair of protruding portions 72 that protrude toward the inside of the rear frame 8 and in a direction substantially perpendicular to the lengthwise direction of the cell guide 24a are provided to the both ends of the cell guide 24a. As shown in FIG. 10, the protruding portions 72 are inserted between the support 30 of the flange 8a and the prongs 54 of the insertion components 48. Thus, the cell guide 24a has the protruding portions 72 that protrude in a direction intersecting the lengthwise direction of the cell guide 24a. The protruding portions 72 of the cell guide 24a are engaged with the intersection components 48 of the rear frame 8, respectively. The protruding portions 72 are disposed between the insertion components 48 and the support 30 of the flange 8a, respectively. Also, the protruding portions 72 are disposed between the prongs 54 of the insertion components and the support 30 of the flange 8a, respectively. Furthermore, in the illustrated embodiment, the cell guide 24a has the protrusions 70 (e.g., one of a protrusion and a concave component), while the positioning components 34 and 36 of the rear frame 8 has concave components 38 and 46 (e.g., the other of the protrusion and the concave component), respectively. The protrusions 70 and the concave components 38 and 46 are engaged with respect to each other such that the cell guide 24a (e.g., the support member) is positioned with respect to the rear frame 8 (e.g., the rear face housing).

The procedure for attaching the cell guide 24a to the flange 8a will now be described. First, as shown in FIG. 9, the cell guide 24a is slid from the outside of the rear frame 8 toward the inside. As shown in FIG. 10, this causes the protruding portions 72 to be inserted between the support 30 of the flange 8a and the prongs 54 of the insertion components 48. At this point, one of the protrusions 70 is inserted into the concave component 38 of the positioning component 34, while the other protrusion 70 is inserted into the concave component 46 of the positioning component 36. The cell guide 24a is thus attached to a short side of the flange 8a.

The cell guide 24c is attached to a short side of the flange 8a in the same manner as the above-mentioned cell guide 24a. The cell guides 24b and 24d are attached to the long sides of the flange 8a. At this point, a plurality of protrusions (not shown) provided to the rear faces of the cell guides 24b and 24d are inserted into the concave components 50 of the insertion components 48, the concave components 46 of the positioning components 36, and the concave components 38 of the positioning components 34 provided on the long sides of the flange 8a. The above-mentioned pair of protruding portions 72 is not provided to the cell guides 24b and 24d.

The liquid crystal cell 26 is configured as a rectangular panel. As shown in FIGS. 7 and 8, the peripheral edges of the liquid crystal cell 26 are supported by the cell guides 24a to 24d that have been fitted together into a frame shape. Cushioning members 74 are attached to the surfaces of the cell guides 24a to 24d. These cushioning members 74 are disposed between the peripheral edges of the liquid crystal cell 26 and the cell guides 24a to 24d. An image is displayed on the liquid crystal cell 26 when light from the backlight unit 16 is shined on the rear face of the liquid crystal cell 26. Thus, the liquid crystal cell 26 (e.g., the display panel) is configured to display image.

The bezels 28a to 28d are disposed on the front sides of the cell guides 24a to 24d. The bezels 28a to 28d are fitted together to configure an overall frame shape. The bezels 28a to 28d are formed from SECC or the like. As shown in FIGS. 7 and 8, a through-hole 76 into which a screw 66 is inserted is provided to each of the bezels 28a to 28d.

The screws 66 are passed through the through-holes 76 in the bezels 28a and 28c and the through-holes 68 in the cell guides 24a and 24c, and are fastened to the screw holes 40 in the positioning components 34. Also, screws (not shown) are passed through the through-holes 76 in the bezels 28b and 28d and the through-holes (not shown) in the cell guides 24b and 24d, and are fastened to the screw holes 40 in the positioning components 34 and the screw holes 52 in the insertion components 48. This fixes the bezels 28a to 28d and the cell guides 24a to 24d to the rear frame 8. The peripheral edges of the liquid crystal cell 26 are sandwiched between the bezels 28a to 28d and the cell guides 24a to 24d. Cushioning members 78 are attached to the rear faces of the bezels 28a to 28d (i.e., the faces opposite the liquid crystal cell 26). These cushioning members 78 are disposed between the peripheral edges of the liquid crystal cell 26 and the bezels 28a to 28d.

The front cabinet 6 is attached to the rear frame 8 by a plurality of screws (not shown) so as to cover the bezels 28a to 28d that have been fitted together in the form of a frame.

The effect obtained by the display device 2 in this embodiment will now be described.

Firstly, a first first effect will be described in detail. As discussed above, the protruding portions 72 that protrude in a direction substantially perpendicular to the lengthwise direction of the cell guide 24a are provided to the ends of the cell guide 24a. Consequently, the cell guide 24a can be attached to the flange 8a without bending the cell guide 24a in its lengthwise direction. As a result, distortion and whitening of the cell guide 24a are less likely to occur. Furthermore, since the cell guide 24a tends not to lift up from the flange 8a, the peripheral edge of the diffusion plate 18 can be easily guided when the peripheral edge of the diffusion plate 18 is being inserted between the cell guide 24a and the flange 8a.

Next, a second effect will now be described. As discussed above, the ends 34a and 34b of each positioning component 34 extend at an angle to a direction substantially perpendicular to the flange 8a of the rear frame 8 such that the width of the positioning component 34 gradually decreases toward the distal end of the positioning component 34. Consequently, as shown in FIG. 5C, the surface area of scrap that has been cut off along the trim line 44 in the stamping of the rear frame 8 will be smaller, by an amount corresponding to the scrap piece 82 (e.g., the portion shaded with dots in FIG. 5C), than the surface area of scrap in accordance with a comparative example in which the cut is made along trim lines 80 extending in a direction substantially perpendicular to the flange 8a. The surface area of scrap can be similarly reduced for the positioning components 36.

Also, as discussed above, the one end 48a of the insertion component 48 extends at an angle to a direction substantially perpendicular to the flange 8a of the rear frame 8 such that the width of the insertion component 48 gradually decreases toward the distal end of the insertion component 48. The one end 54a of the prong 54 also extends at an angle to a direction substantially parallel to the flange 8a of the rear frame 8 such that the width of the prong 54 gradually decreases toward the distal end of the prong 54. Consequently, as shown in FIG. 6C, the surface area of scrap cut off along the trim lines 58 in the stamping of the rear frame 8 is smaller, by an amount corresponding to the scrap pieces 86 (e.g., the portion shaded with dots in FIG. 6C), than the surface area of scraps in accordance with a comparative example in which the cut is made along trim lines 84 extending in a direction substantially perpendicular to the flange 8a and in a direction substantially parallel to the flange 8a.

Therefore, the surface area of scrap cut off in the stamping of the rear frame 8 can be kept small. Thus, the scrap can be smoothly discharged into the scrap chute of the stamper die.

Second Embodiment

Figure 11:
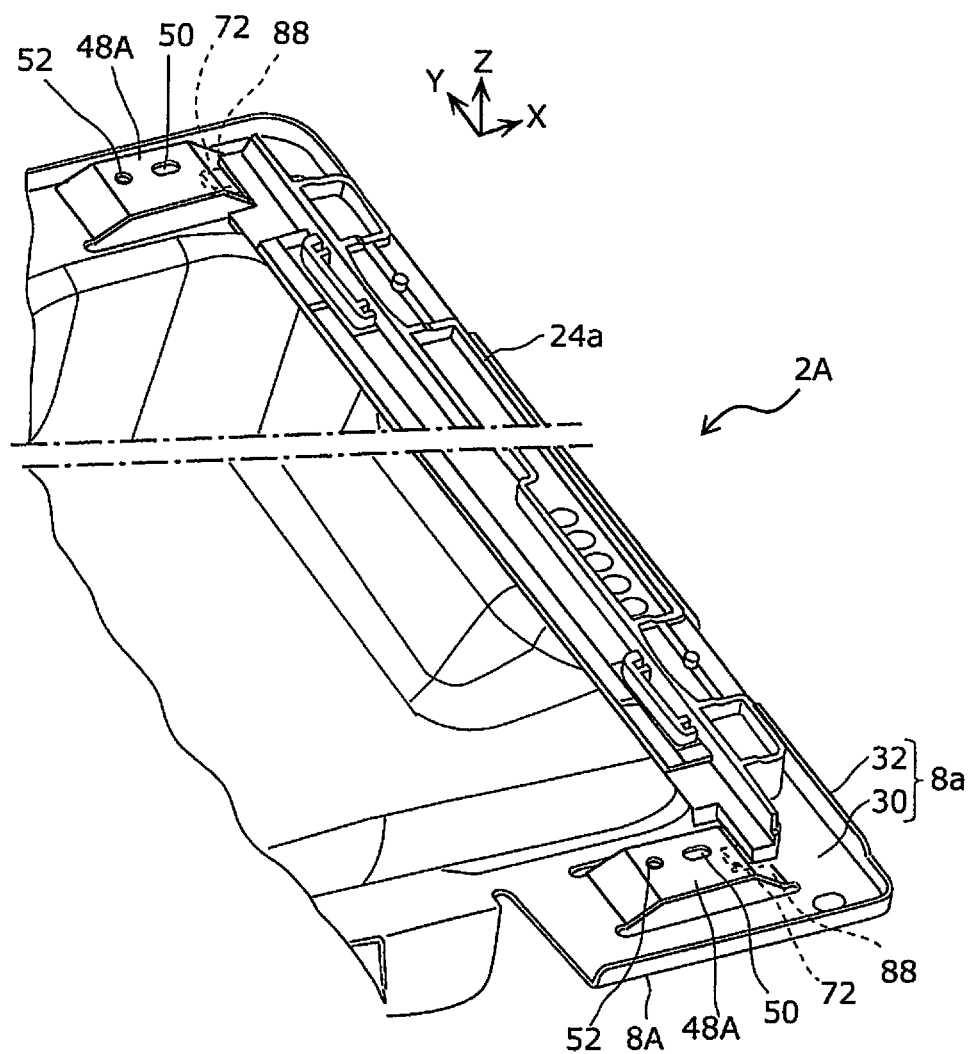
FIG. 11 is a partial perspective view of a display device in accordance with a second embodiment, illustrating a state when a cell guide of the display device is attached to a flange of a rear frame.
Figure 12:
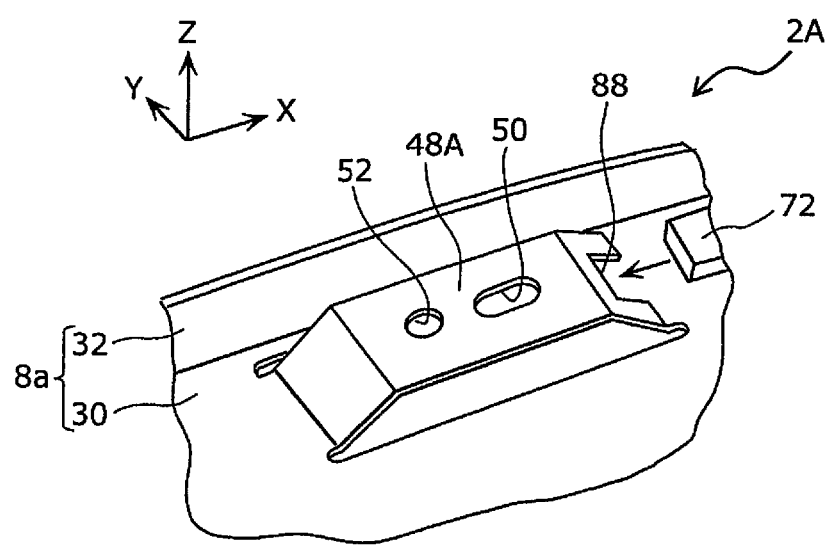
FIG. 12 is a partial perspective view of an insertion component of the display device illustrated in FIG. 11.

Referring now to FIGS. 11 and 12, a display device 2A in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 11 is a partial perspective view of the display device 2A, illustrating a state when a cell guide 24a of the display device 2A is attached to a flange 8a of a rear frame 8A. FIG. 12 is a partial perspective view of an insertion component 48A of the display device 2A in FIG. 11.

As shown in FIG. 11, with the display device 2A in this embodiment, the insertion components 48A of the rear frame 8A are formed by cutting and drawing part of a support 30 of the flange 8a to the cell guide 24a side. Insertion holes 88 into which protruding portions 72 of the cell guide 24a are inserted, respectively, are provided to the insertion components 48A. Just as with the insertion components 48 in the first embodiment above, concave components 50 and screw holes 52 are provided to the insertion components 48A. Thus, the insertion components 48A each have a drawing part with the insertion hole 88 that is formed by drawing a part of the support 30 (e.g., the peripheral edge portion) of the rear frame 8A (e.g., the rear face housing) to a front side of the display device 2A. The, the protruding portions 72 are disposed within the insertion holes 88, respectively.

As shown in FIG. 12, when the cell guide 24a is attached to the flange 8a, the protruding portions 72 are inserted into the insertion holes 88 of the insertion components 48A. Therefore, the same effect can be obtained in this embodiment as in the first embodiment above.

Third Embodiment

Figure 13:
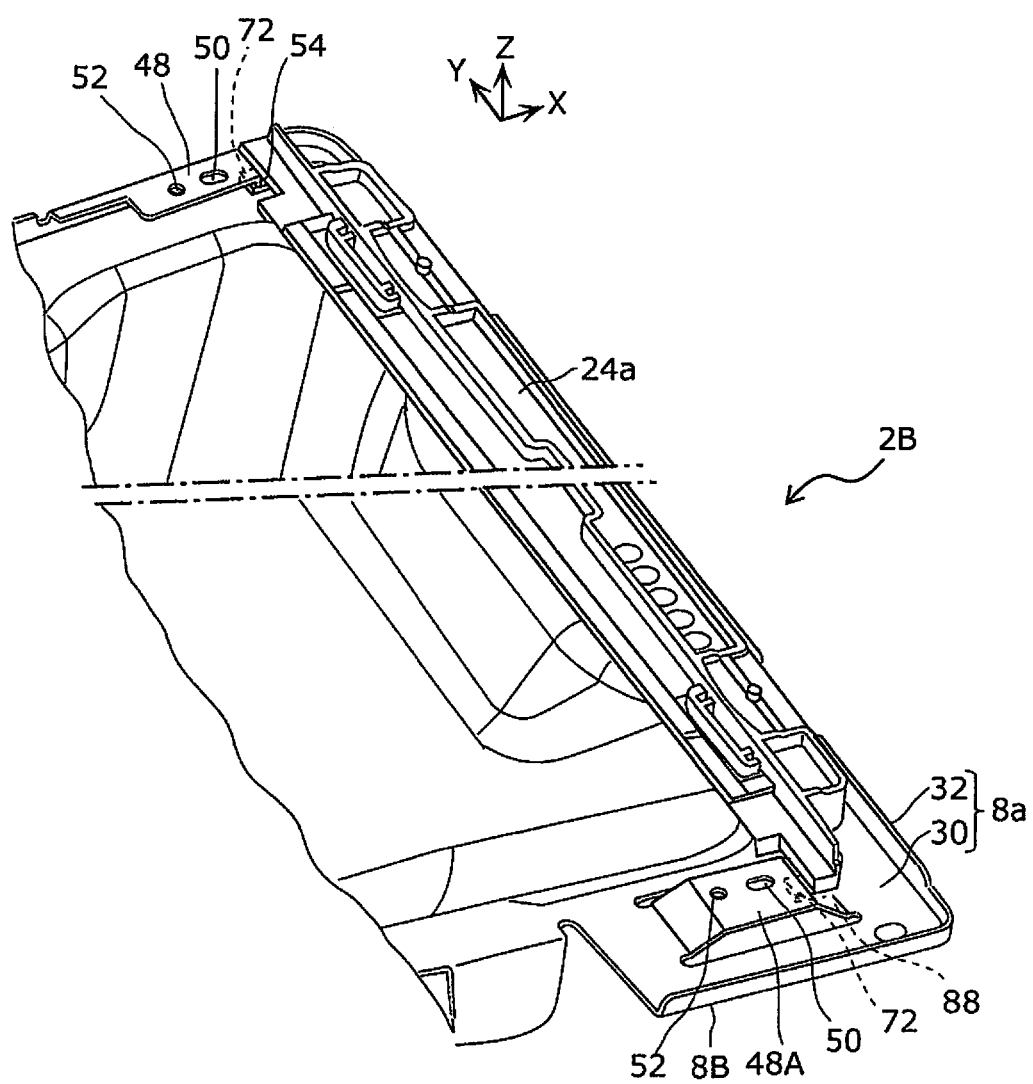
FIG. 13 is a partial perspective view of a display device in accordance with a third embodiment, illustrating a state when a cell guide of the display device is attached to a flange of a rear frame.

Referring now to FIG. 13, a display device 2B in accordance with a third embodiment will now be explained. In view of the similarity between the first to third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

FIG. 13 is a partial perspective view of the display device 2B, illustrating a state when a cell guide 24a of the display device 2B is attached to a flange 8a of a rear frame 8B.

As shown in FIG. 13, with the display device 2B in this embodiment, insertion components 48 and insertion components 48A are provided to the flange 8a of the rear frame 8B as the insertion components for attaching the cell guide 24a. The insertion components 48 here are configured the same as the insertion components 48 in the first embodiment above. The insertion components 48A are configured the same as the insertion components 48A in the second embodiment above.

When the cell guide 24a is attached to the flange 8a, one of the protruding portions 72 is inserted between a support 30 of the flange 8a and a prong 54 of the insertion component 48, while the other protruding portion 72 is inserted into an insertion hole 88 in the insertion component 48A. Therefore, the same effect can be obtained in this embodiment as in the first or second embodiment above.

Fourth Embodiment

Figure 14:
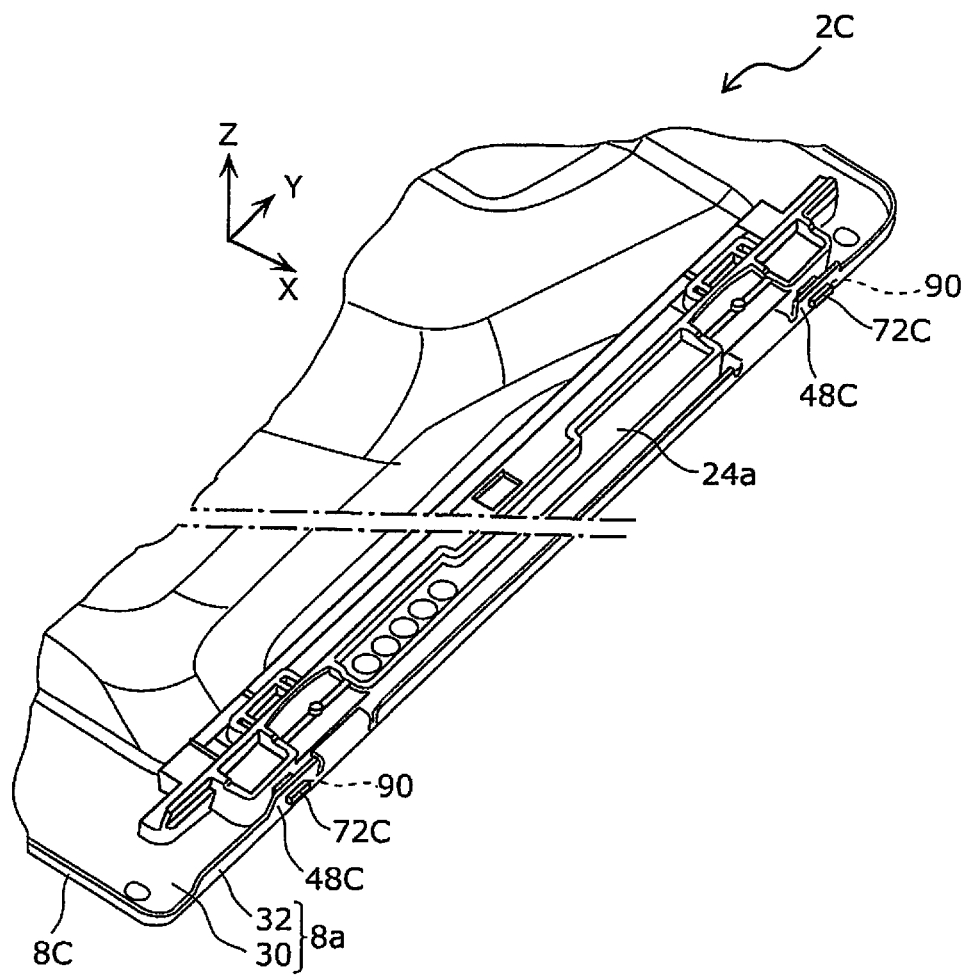
FIG. 14 is a partial perspective view of a display device in accordance with a fourth embodiment, illustrating a state when a cell guide of the display device is attached to a flange of a rear frame.

Referring now to FIG. 14, a display device 2C in accordance with a fourth embodiment will now be explained. In view of the similarity between the first to fourth embodiments, the parts of the fourth embodiment that are identical to the parts of the first, second or third embodiment will be given the same reference numerals as the parts of the first, second or third embodiment. Moreover, the descriptions of the parts of the fourth embodiment that are identical to the parts of the first, second or third embodiment may be omitted for the sake of brevity.

FIG. 14 is a partial perspective view of the display device 2C, illustrating a state when a cell guide 24a of the display device 2C is attached to a flange 8a of a rear frame 8C.

As shown in FIG. 14, with the display device 2C in this embodiment, a pair of protruding portions 72C of the cell guide 24a protrudes toward the outside of the rear frame 8C and in a direction substantially perpendicular to the lengthwise direction of the cell guide 24a. Furthermore, a pair of insertion components 48C is provided to the short sides of the flange 8a. The insertion components 48C each extend from a bent component 32 of the flange 8a toward the cell guide 24a side. An insertion hole 90 into which the protruding portion 72C is inserted is provided to each of the insertion components 48C. Thus, the insertion components 48C extend from the peripheral edge of the support 30 (e.g., the peripheral edge portion) of the rear frame 8C to a front side of the display device 2C. The insertion components 48C have the insertion holes 90, respectively. The protruding portions 72C are disposed within the insertion holes 90, respectively.

When the cell guide 24a is attached to the flange 8a, first the cell guide 24a is slid from the inside of the rear frame 8C toward the outside. Consequently, the protruding portions 72C are inserted into the insertion holes 90 of the insertion components 48C. Therefore, the same effect can be obtained in this embodiment as in the first, second or third embodiment above.

The display devices in accordance with the first to fourth embodiments are provided for illustration only and not for the purpose of limiting the invention to these embodiments. For example, the various embodiments given above can be combined with each other.

In the illustrated embodiments, the display devices are described as being a liquid crystal television set. However, the display devices can instead be a liquid crystal monitor used for a personal computer, for example.

In the illustrated embodiments, the both ends of the positioning components extend at an angle to a direction substantially perpendicular to the flange of the rear frame. However, the configuration can be such that only one end of the positioning components extends at an angle to a direction substantially perpendicular to the flange of the rear frame.

In the first to third embodiments above, the one end of the insertion components extends at an angle to a direction substantially perpendicular to the flange of the rear frame. However, the configuration can be such that both ends of the insertion components extend at an angle to a direction substantially perpendicular to the flange of the rear frame.

In the illustrated embodiments, the protruding portions protrude in a direction substantially perpendicular to the lengthwise direction of the cell guide. However, the protruding portions can instead protrude at an angle to the lengthwise direction of the cell guide.

In the illustrated embodiments, the protrusions are provided to the cell guide, and the concave components are provided to the positioning components. However, this can be reversed so that concave components are provided to the cell guide, and protrusions are provided to the positioning components.

In the first to third embodiments above, the prongs are provided to the insertion components. However, these prongs can be omitted. In this case, the protruding portions of the cell guide are inserted between the support of the flange and the ends of the insertion components.

The display devices can be applied as a liquid crystal television set, for example.

The display device in accordance with one aspect includes a display panel, a rear face housing, and a slender support member. The display panel is configured to display image. The rear face housing is disposed on a rear side of the display device with respect to the display panel. The support member is disposed between a peripheral edge portion of the display panel and a peripheral edge portion of the rear face housing. The support member supports the peripheral edge portion of the display panel from the rear side. The support member has a protruding portion that protrudes in a direction intersecting a lengthwise direction of the support member. The rear face housing includes an insertion component at the peripheral edge portion of the rear face housing, with the protruding portion of the support member being engaged with the insertion component of the rear frame housing.

With this aspect, the support member has a protruding portion that protrudes in the direction intersecting the lengthwise direction of the support member. Thus, the protruding portion can be inserted into the insertion component at the peripheral edge portion of the rear face housing without bending the support member in its lengthwise direction. This suppresses distortion or whitening of the support member when the support member is attached to the peripheral edge portion of the rear face housing. Furthermore, the support member tends not to lift up from the peripheral edge portion of the rear face housing. Thus, a peripheral edge of a diffusion plate, etc., can be easily guided when the peripheral edge of the diffusion plate, etc., is being inserted between the support member and the peripheral edge portion of the rear face housing.

With the display device, the configuration can be such that the rear face housing is made of sheet metal.

With this aspect, the rear face housing can be made of the sheet metal.

With the display device, the configuration can be such that the insertion component inwardly extends to face with the peripheral edge portion of the rear face housing, and the protruding portion is disposed between the insertion component and the peripheral edge portion of the rear face housing.

With this aspect, the insertion component can be formed by folding from the peripheral edge portion of the rear face housing toward the inside of the rear face housing.

With the display device, the configuration can be such that the insertion component has a prong that extends toward the peripheral edge portion of the rear face housing, and the protruding portion is disposed between the prong and the peripheral edge portion of the rear face housing.

With this aspect, the insertion component has the prong that extends toward the peripheral edge portion of the rear face housing. Thus, the protruding portion can be stably inserted between the prong and the peripheral edge portion of the rear face housing.

With the display device, the configuration can be such that the insertion component has end edges that non-parallelly extend with respect to each other such that a width of the insertion component measured between the end edges gradually decreases toward a distal end of the insertion component.

With this aspect, one or both end edges of the insertion component extend at an angle. For example, one or both end edges extend at an angle to a direction substantially perpendicular to a bent component that extends from the peripheral edge portion of the rear face housing. Thus, the surface area of scrap can be kept small when the unnecessary contour portion of the rear face housing is cut off along a trim line in the stamping of the rear face housing. As a result, the scrap can be smoothly discharged into the scrap chute of the stamper die.

With the display device, the configuration can be such that the insertion component has a drawing part with an insertion hole that is formed by drawing a part of the peripheral edge portion of the rear face housing to a front side of the display device, and the protruding portion is disposed within the insertion hole.

With this aspect, the insertion component can be formed by drawing the part of the peripheral edge portion of the rear face housing to the front side (e.g., to the support member side).

With the display device, the configuration can be such that the insertion component extends from the peripheral edge portion of the rear face housing to a front side of the display device, the insertion component has an insertion hole, and the protruding portion is disposed within the insertion hole.

With this aspect, the insertion component can be formed by extending part of the peripheral edge portion of the rear face housing to the front side (e.g., toward the support member side).

With the display device, the configuration can be such that the rear face housing further includes a positioning component arranged to position the support member with respect to the rear face housing at the peripheral edge portion of the rear face housing, the positioning component inwardly extends to face with the peripheral edge portion of the rear face housing, and the positioning component has end edges that non-parallelly extend with respect to each other such that a width of the positioning component measured between the end edges gradually decreases toward a distal end of the positioning component.

With this aspect, one or both end edges of the positioning component extend at an angle. For example, one or both end edges extend at an angle to a direction substantially perpendicular to a bent component that extends from the peripheral edge portion of the rear face housing. Thus, the surface area of scrap can be kept small when the unnecessary contour portion of the rear face housing is cut off along a trim line in the stamping of the rear face housing. As a result, the scrap can be smoothly discharged into the scrap chute of the stamper die.

With the display device, the configuration can be such that the support member further has one of a protrusion and a concave component, the positioning component of the rear frame housing further has the other of the protrusion and the concave component, and the protrusion and the concave component are engaged with respect to each other such that the support member is positioned with respect to the rear face housing.

With this aspect, the support member can be positioned with respect to the rear face housing by inserting the protrusion into the concave component.

The display device in accordance with one aspect includes a display panel, a rear face housing, and a slender support member. The display panel is configured to display image. The rear face housing is disposed on a rear side of the display device with respect to the display panel. The rear housing is made of sheet metal. The support member is disposed between a peripheral edge portion of the display panel and a peripheral edge portion of the rear face housing. The support member supports the peripheral edge portion of the display panel from the rear side. The rear face housing includes a mounting component for mounting the support member relative to the rear face housing at the peripheral edge portion of the rear face housing. The mounting component inwardly extends to face with the peripheral edge portion of the rear face housing. The mounting component has end edges that non-parallelly extend with respect to each other such that a width of the mounting component measured between the end edges gradually decreases toward a distal end of the mounting component.

With this aspect, one or both end edges of the mounting component extend at an angle. For example, one or both end edges extend at an angle to a direction substantially perpendicular to a bent component that extends from the peripheral edge portion of the rear face housing. Thus, the surface area of scrap can be kept small when the unnecessary contour portion of the rear face housing is cut off along a trim line in the stamping of the rear face housing. As a result, the scrap can be smoothly discharged into the scrap chute of the stamper die.

With the display device, distortion and so forth of the support member can be suppressed when the support member is attached to the peripheral edge portion of the rear face housing. Furthermore, fewer scrap discharge problems will be encountered.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
   a display having a rectangular shape with four edge portions;
   a rear housing disposed on a rear facing side of the display, the rear housing having a rear facing wall with four edge portions and extension side walls extending from the edge portions of the rear facing wall towards a front of the display device; and
   a support member disposed between one of the edge portions of the display and one of the edge portions of the rear facing wall, the support member supporting only the one of the edge portions of the display from the rear facing side,
   the support member having an elongated main body that extends in a lengthwise direction of the support member, and a protruding portion that protrudes from an end part of the elongated main body in a direction that is perpendicular to the lengthwise direction of the support member inwardly towards a center of the display, and
   the rear housing including an insertion component that is adjacent to the one of the edge portions of the rear facing wall, with the insertion component being spaced from a corner defined between the one of the edge portions of the rear facing wall and the adjacent one of the edge portions of the rear facing wall, with a front facing side of the protruding portion of the support member being engaged with a rear facing side of the insertion component of the rear housing.

2. The display device according to claim 1, wherein the rear housing is made of sheet metal.

3. The display device according to claim 1, wherein
   the insertion component inwardly extends to face the adjacent one of the edge portions of the rear facing wall, and
   the protruding portion is disposed between the insertion component and the adjacent one of the edge portions of the rear facing wall.

4. The display device according to claim 1, wherein
   the insertion component has a prong that extends towards the adjacent one of the edge portions of the rear facing wall, and
   the protruding portion is disposed between the prong and the adjacent one of the edge portions of the rear facing wall.

5. The display device according to claim 1, wherein
   the insertion component has end edges that non-parallelly extend with respect to each other, a width of the insertion component measured between the end edges gradually decreasing towards a distal end of the insertion component.

6. The display device according to claim 1, wherein
   the insertion component has a drawing part with an insertion hole that is formed by drawing a part of the adjacent one of the edge portions of the rear facing wall towards the front of the display device, the protruding portion being disposed within the insertion hole.

7. The display device according to claim 1, wherein
   the insertion component extends from the adjacent one of the edge portions of the rear facing wall towards the front of the display device, the insertion component having an insertion hole, the protruding portion being disposed within the insertion hole.

8. The display device according to claim 1, wherein
   the rear housing further includes a positioning component arranged to position the support member with respect to the rear housing at the one of the edge portions of the rear facing wall,
   the positioning component inwardly extends to face the one of the edge portions of the rear facing wall, and
   the positioning component has end edges that non-parallelly extend with respect to each other, a width of the positioning component measured between the end edges gradually decreasing towards a distal end of the positioning component.

9. The display device according to claim 8, wherein
   the support member further has one of a protrusion and a concave component,
   the positioning component of the rear housing further has the other of the protrusion and the concave component, and
   the protrusion and the concave component are engaged with respect to each other to position the support member with respect to the rear housing.

10. The display device according to claim 8, wherein
    the positioning component inwardly extends from one of the extension side walls that extends from the one of the edge portions of the rear facing wall to face the one of the edge portions of the rear facing wall.

11. The display device according to claim 1, wherein
    the insertion component inwardly extends from one of the extension side walls that extends from the adjacent one of the edge portions of the rear facing wall to face the adjacent one of the edge portions of the rear facing wall.

12. A display device comprising:
    a display having a rectangular shape with four edge portions;
    a rear housing disposed on a rear facing side of the display, the rear housing being made of sheet metal, the rear housing having a rear facing wall with four edge portions and extension side walls extending from the edge portions of the rear facing wall towards a front of the display device; and a support member disposed between one of the edge portions of the display and one of the edge portions of the rear facing wall, the support member supporting only the one of the edge portions of the display from the rear facing side, the support member having an elongated main body that extends in a lengthwise direction of the support member, and a protruding portion that protrudes from an end part of the elongated main body in a direction that is perpendicular to the lengthwise direction of the support member inwardly towards a center of the display, the rear housing including an insertion component that is adjacent to the one of the edge portions of the rear facing wall, with the insertion component being spaced from a corner defined between the one of the edge portions of the rear facing wall and the adjacent one of the edge portions of the rear facing wall, with a front facing side of the protruding portion of the support member being engaged with a rear facing side of the insertion component of the rear housing, and the rear housing further including a mounting component for mounting the support member relative to the rear housing at the one of the edge portions of the rear facing wall, the mounting component inwardly extending to face the one of the edge portions of the rear facing wall, and the mounting component having end edges that non-parallelly extend with respect to each other, a width of the mounting component measured between the end edges gradually decreasing towards a distal end of the mounting component.

* * * * *